United States Patent
Ricard et al.

(10) Patent No.: US 6,223,176 B1
(45) Date of Patent: Apr. 24, 2001

(54) METHOD AND COMPUTER PROGRAM PRODUCT FOR IMPLEMENTING HIGHLY CONCURRENT RECORD INSERTION IN AN ORDINAL NUMBER DEPENDENT DATABASE

(75) Inventors: Gary Ross Ricard, Chatfield; Richard Miles Rocheleau; Wayne Christopher Sadecki, both of Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/160,817

(22) Filed: Sep. 25, 1998

(51) Int. Cl.$^7$ ................................................. G06F 17/30
(52) U.S. Cl. ........................... 707/8; 707/202; 707/205; 711/147
(58) Field of Search ........................... 707/1, 2, 8, 205, 707/103, 100, 202; 711/14

(56) References Cited

U.S. PATENT DOCUMENTS

| | | | |
|---|---|---|---|
| 5,553,267 | * | 9/1996 | Herlihy ................................ 711/147 |
| 5,664,184 | * | 9/1997 | Ferguson et al. ..................... 707/103 |
| 5,717,919 | * | 2/1998 | Kodavalla et al. ....................... 707/8 |
| 5,717,921 | * | 2/1998 | Lomet et al. ......................... 707/100 |
| 5,761,660 | * | 6/1998 | Josten et al. ............................. 707/8 |
| 5,873,097 | * | 2/1999 | Harris et al. ......................... 707/203 |
| 5,897,634 | * | 4/1999 | Attaluri et al. .......................... 707/8 |
| 5,960,446 | * | 9/1999 | Schmuck et al. .................... 707/205 |
| 5,978,791 | * | 11/1999 | Farber et al. ............................ 707/2 |

OTHER PUBLICATIONS

IBM Disclosure Bulletin, "High Currency Data Base File Inserts", vol. 33, No. 6A, Nov. 1990, pp. 94–103.
IBM Technical Disclosure Bulletin, "Efficient Pipelining Of Data Base Insertions", vol. 34, No. 6, Nov. 1991, pp. 1–5.
High Concurrecy Data Base (NA901184) Nov. 1990.*

* cited by examiner

*Primary Examiner*—Kim Vu
*Assistant Examiner*—Anh Ly
(74) *Attorney, Agent, or Firm*—Joan Pennington (57) ABSTRACT

A method and computer program product are provided for implementing highly concurrent record insertion in an ordinal number dependent database. Serialized processing is provided with one concurrent task of multiple concurrent tasks allowed to execute, for allocation of ordinal numbers for record insertion. Concurrent validation processing operations of multiple concurrent tasks are enabled for record insertion in the ordinal number dependent database. A set of counter variables are maintained with the database to enable removal of serialization from the validation phase processing operations for record insertion in the ordinal number dependent database.

10 Claims, 10 Drawing Sheets

| |
|---|
| ALL RECORDS ARE VALID INSERTED |
| TENATIVE INSERT FORCE COUNT 302 (TentInsForceCount) |
| MAY BE VALID. IF VALID AT LAST FORCE, THEN RECORD IS FORCED. |
| INSERT FORCE COUNT 304 (ForceCount) |
| MAY BE VALID, BUT ALL RECORDS ARE UNFORCED |
| TOTAL RECORD COUNT 306 (RecordCount) |
| ALL RECORDS ARE NOT VALID |
| TOTAL RECORD LIMIT 308 (RecordLimit) |

METHOD AND COMPUTER PROGRAM PRODUCT FOR IMPLEMENTING HIGHLY CONCURRENT RECORD INSERTION IN AN ORDINAL NUMBER DEPENDENT DATABASE

FIELD OF THE INVENTION

The present invention relates to the data processing field, and more particularly, relates to a method and computer program product for implementing highly concurrent record insertion in an ordinal number dependent database.

DESCRIPTION OF THE RELATED ART

In a highly concurrent environment where a database workload is performing many insert operations on an ordinal number dependent database, serialization mechanisms used while making the inserted record valid, cause a slowdown in system throughput. The functions performed while making an inserted record valid, referred to in the present description as the validation step, include journalling the insert operation and marking the record as valid such that a retrieve program may view the record. Typically the validation step also ensures that ordinal numbers of a lower ordinal number become valid prior to higher ordinal numbers. In the validation step, serialization is used for three reasons described below.

First, there may be an ordinal number order requirement on a write-ahead database journal for insert type entries. This ordinal number order requirement mandates that inserted records of a lower ordinal number are logged in the journal prior to records of a higher ordinal number, such that if recovery from the journal is necessary, the inserted records will retain their ordinal position. Since the journalling of inserts is performed within this validation step, ordinal number order logging to the journal is guaranteed.

Second, the validation step serialization is used to ensure database retrieval methods can view all the records up to the last valid ordinal number. Since the records become valid in ordinal order, a retrieve program is guaranteed that all records up to the last ordinal number are valid completed inserted records.

Third, the validation step serialization can be used to ensure that no holes in the data space exist when a concurrent insert fails to complete. For example, if there are two concurrent insert processes, such that process A is inserting into ordinal N and process B is inserting into ordinal N+l, and process A fails its insert, the validate step will allow process B to slide its records into ordinal N, thus ensuring no holes are in the database file.

In highly concurrent workloads that perform many database insert operations to a given file, the serialization of the validated step of insert has been shown to be a large limit to a system's scalability. A known insertion method is disclosed in HIGH CONCURRENCY DATA BASE FILE INSERTS, by Ricard et al., IBM Technical Disclosure Bulletin, Vol. 33 No. 6A, November 1990.

A mechanism is needed to remove this serialization from the validation step, while addressing the reasons for the serialization.

SUMMARY OF THE INVENTION

A principal object of the present invention is to provide an improved method and computer program product for implementing highly concurrent record insertion in an ordinal number dependent database. Other important objects of the present invention are to provide such improved method and computer program product substantially without negative effects and that overcome many disadvantages of prior art arrangements.

In brief, a method and computer program product are provided for implementing highly concurrent record insertion in an ordinal number dependent database. Serialized processing is provided with one concurrent task of multiple concurrent tasks allowed to execute, for allocation of ordinal numbers for record insertion. Concurrent validation processing operations of multiple concurrent tasks are enabled for record insertion in the ordinal number dependent database.

In accordance with features of the invention, a set of counter variables are maintained with the database to enable removal of serialization from the validation phase processing operations for record insertion in the ordinal number dependent database.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
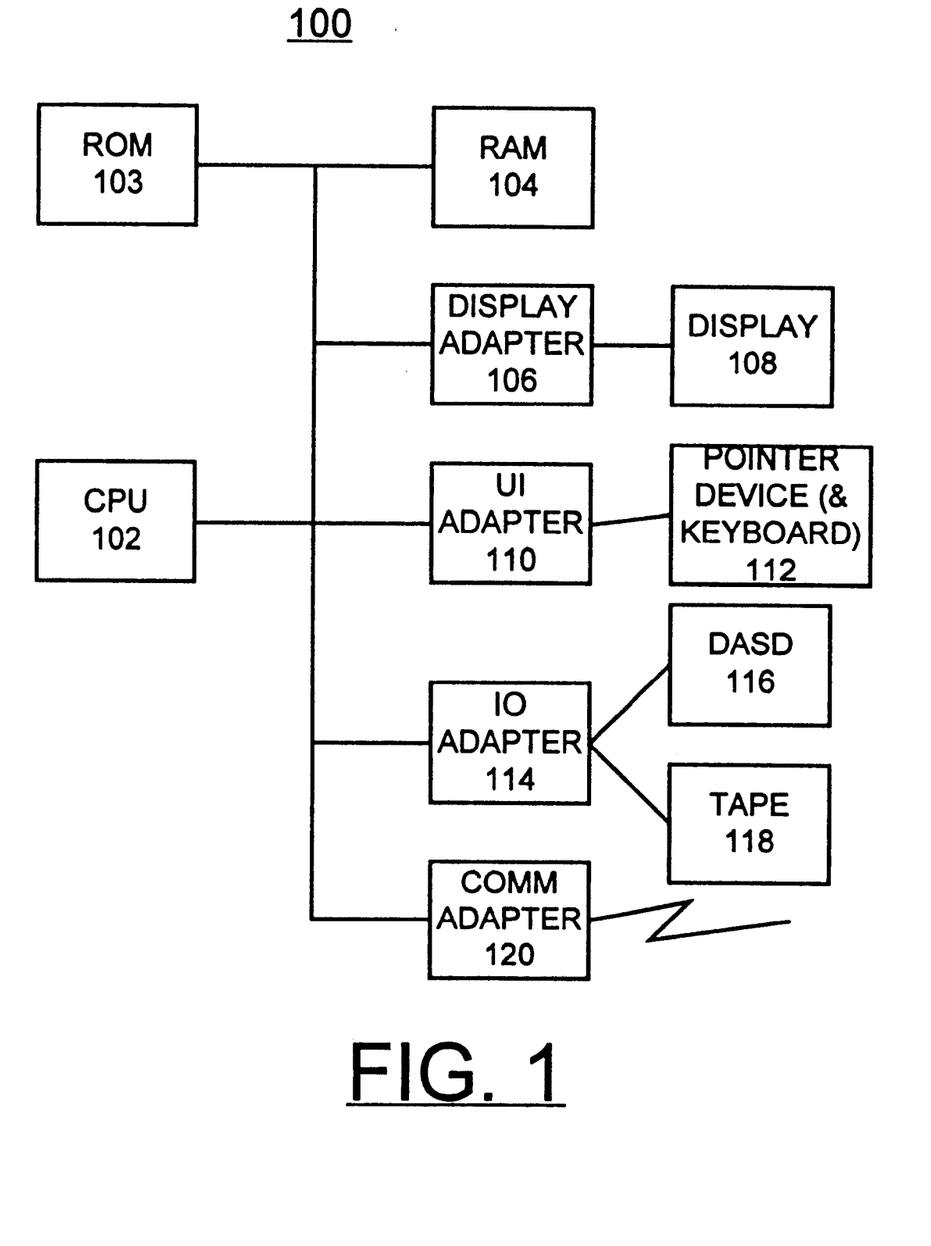
FIG. 1 is a block diagram representation illustrating a computer system for implementing highly concurrent record insertion in an ordinal number dependent database in accordance with the preferred embodiment.
Figure 2:
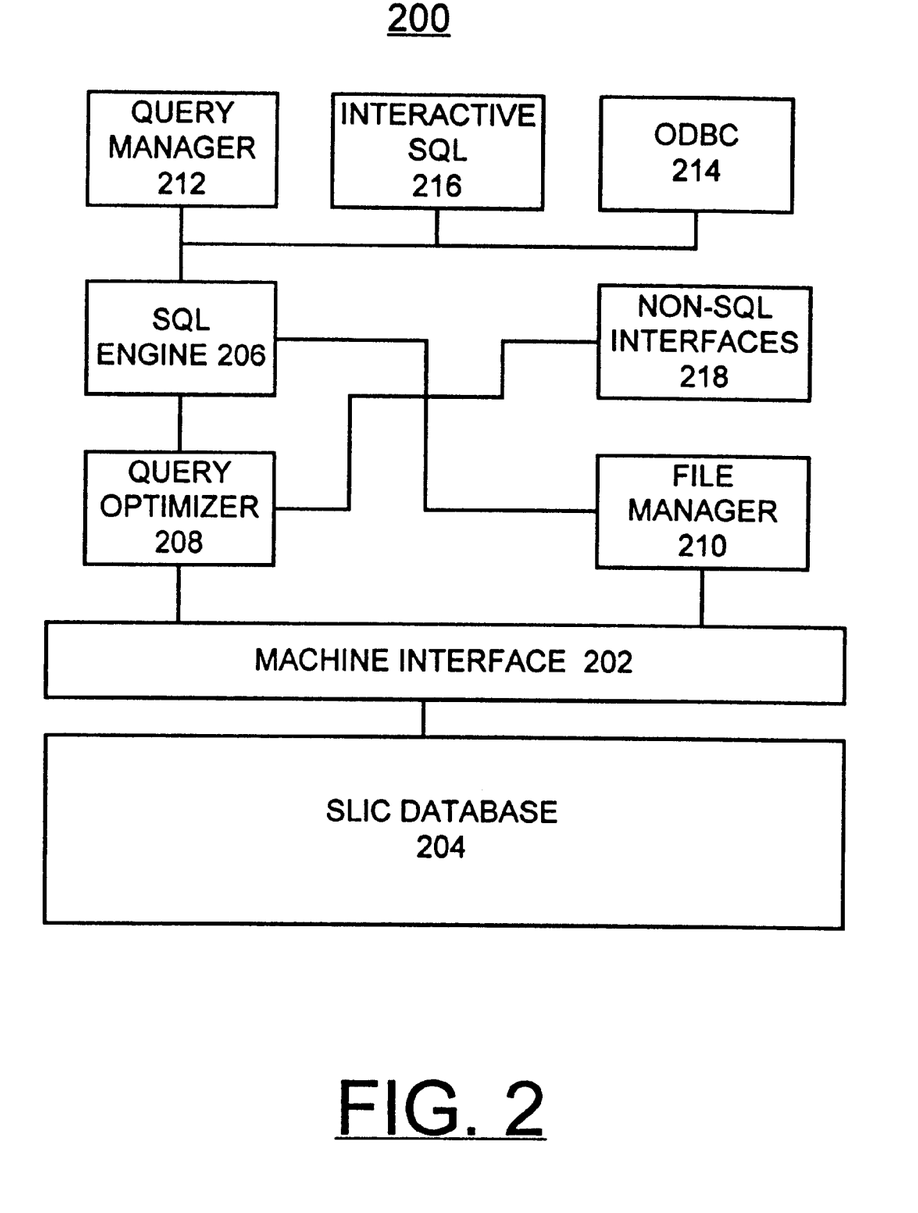
FIG. 2 is a block diagram representation illustrating an operation system of the computer system of FIG. 1 of the preferred embodiment.

Having reference now to the drawings, in FIGS. 1 and 2, there is shown a computer or data processing system of the preferred embodiment generally designated by the reference character 100. As shown in FIG. 1, computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function.

Referring to FIG. 2, there is illustrated the DB2/400 database generally designated 200 integrated into the OS/400 operating system. The database 200 is separated into two parts by a Machine Interface (MI) 202. The MI 202 is a logical, not a physical interface to the system. The only way to communicate with the hardware and some of the system software below the MI is through the MI boundary 202. The MI architecture consists of a set of instructions that operate on objects. While OS/400 is not an object-oriented system, it is an object-based system. The MI interface 202 is used by all facets of the OS/400 operating system, including the DB2/400 database manager. Below the MI, are the machine dependent parts of the database manager and the low-level interfaces called System Licensed Internal Code (SLIC) database 204. This includes the low-level database access, the index manager, and log manager called journalling in DB2/400. Above the MI, are the query based user interfaces including a SQL engine 206, a query optimizer 208, and a database file system manager 210. The SQL engine 206 receives an SQL statement through such interfaces such as a Query Manager 212 which is a end-user query tool, from an ODBC driver program 214, or an SQL precompiled program 216. Non-SQL interfaces 218 is used with the query optimizer 208.

Various commercially available processors could be used for computer system 100, for example, an IBM personal computer or similar workstation can be used. An example of a specific computer system on which the invention may be implemented is the International Business Machines Corp. AS/400 computer system. Each central processor unit 102 is suitably programmed to execute the flowcharts of FIGS. 4, 5, 6, 7, 8, and 9 for implementing highly concurrent record insertion in an ordinal number dependent database of the preferred embodiment.

In accordance with features of the preferred embodiment, serialization is removed from the validation step of database insert processing, hence improving system throughput. In addition to addressing the above three described reasons for the serialization, the method of the preferred embodiment also addresses requirements for forcing the inserted records and system initial program load (IPL) recovery of the database in the case of system abnormal termination. This method for highly concurrent insertions of database records in an ordinal number dependent database of the preferred embodiment has proven to improve performance and scalability significantly. Removal of the validation step serialization during the insertion of the database record is key to the improved performance.

Figure 3:
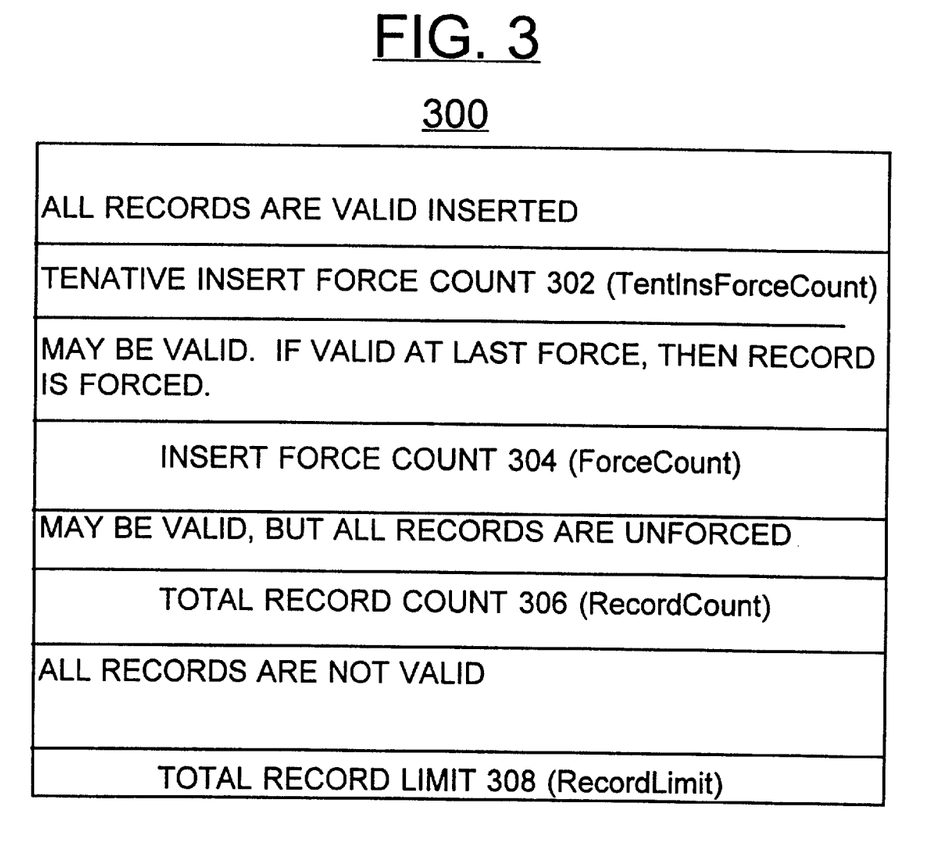
FIG. 3 is a block diagram representation illustrating a database file of the computer system of FIG. 1 of the preferred embodiment.

FIG. 3 illustrates a database file structure generally designated 300 of the preferred embodiment. Database file structure 300 includes a set of counter variables, TENTATIVE INSERT FORCE COUNT 302, INSERT FORCE COUNT 304, TOTAL RECORD COUNT 306, and TOTAL RECORD LIMIT 308, to enable removal of serialization from the validation phase of insert processing. The counter variables TENTATIVE INSERT FORCE COUNT 302, INSERT FORCE COUNT 304, TOTAL RECORD COUNT 306, and TOTAL RECORD LIMIT 308 are stored with the database file structure 300, such as in the database file header. The counter variables TENTATIVE INSERT FORCE COUNT 302, INSERT FORCE COUNT 304, TOTAL RECORD COUNT 306, and TOTAL RECORD LIMIT 308 are used to allow for invalid records prior to the last ordinal number. One of the primary obstacles in removing the serialization is providing a method which allows for ordinals to be invalid prior to the last record in the file. Without this serialization, it is possible for ordinal N+1 to become a valid retrievable record prior to ordinal number N. The set of counter variables TENTATIVE INSERT FORCE COUNT 302, INSERT FORCE COUNT 304, TOTAL RECORD COUNT 306, and TOTAL RECORD LIMIT 308 are defined as follows:

The counter variable, TENTATIVE INSERT FORCE COUNT 302 (TentInsForceCount), holds the ordinal number such that all records less than or equal to this ordinal number are guaranteed to be valid non-tentatively inserted and forced to non-volatile storage. A tentatively inserted record is defined as an insert that has not completed the validation phase of the insert processing. Any records after this count are not guaranteed to be a valid forced record. The counter variable, TENTATIVE INSERT FORCE COUNT 302 is defined such that it is always greater than or equal to the ordinal number zero, and it is always less than or equal to the ordinal value of INSERT FORCE COUNT 304.

The counter variable, INSERT FORCE COUNT 304 (ForceCount), holds the ordinal number of the last record that was forced. Although this ordinal number signifies the last record that was forced, it does not guarantee that all inserts prior to its value have been forced. All inserted ordinals after the INSERT FORCE COUNT 304 value have not been forced to non-volatile storage. This counter is defined such that it is always greater than or equal to TENTATIVE INSERT FORCE COUNT 302, and it is always less than or equal to the TOTAL RECORD COUNT 306.

The counter variable, TOTAL RECORD COUNT 306 (RecordCount), holds the highest validated ordinal number in the database file. All ordinals greater than this variable are considered invalid. The counter variable, TOTAL RECORD COUNT 306 is defined such that it is always greater than or equal to INSERT FORCE COUNT 304, and it is always less than or equal to TOTAL RECORD LIMIT 308.

The counter variable, TOTAL RECORD LIMIT 308 (RecordLimit), holds the last ordinal number that nonvolatile memory has been allocated for in the database file. The variable TOTAL RECORD LIMIT 308 is defined such that it is always greater than or equal to TOTAL RECORD COUNT 306.

The counter variable, TOTAL RECORD COUNT 306 in the database file header 300 is maintained by insert processing. With the conventional validation step serialized in ordinal number order, an insert process was able to update the RecordCount variable to the ordinal number of the last record in the insert process. However, without the validated step serialization, an insert of a higher ordinal number may have completed prior to a process inserting a record with a lower ordinal number. Consequently, TOTAL RECORD COUNT 306, RecordCount, can only be updated to the ordinal number of the inserted record if the ordinal number is greater than the current value of RecordCount. Simply stated:

IF InsertOrdinalNumber>RecordCount THEN RecordCount=InsertOrdinalNumber;

The maintenance of the TENTATIVE INSERT FORCE COUNT 302 and INSERT FORCE COUNT 304, TentInsForceCount and ForceCount, variables in the database structure header 300 is performed during the force processing. Force processing is defined as the movement of database records from volatile to non-volatile memory. Exemplary steps used by the force method of the preferred embodiment to force the database records and maintain the counters are illustrated and described with respect to FIGS. 8 and 9.

Figure 4:
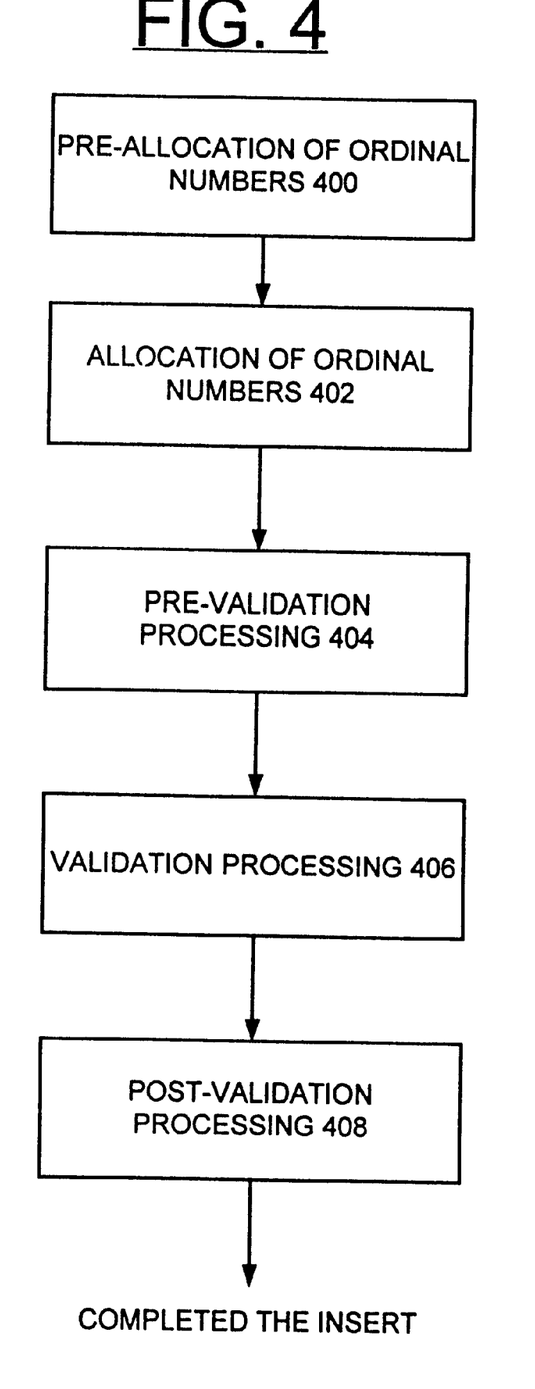
FIGS. 4, 5, 6, 7, 8 and 9 are flow diagrams illustrating exemplary steps of the method and computer program product of the preferred embodiment.

Referring to FIG. 4, a flow diagram illustrating exemplary steps or phases of insert processing for insertion of records into an ordinal number dependent database of the preferred embodiment. Traditional methods for insertion of records into an ordinal number dependent database can be broken up into five phases. While many of these phases can be performed concurrently, the validation step has been performed serially. In the insert processing for insertion of records into an ordinal number dependent database of the preferred embodiment, serialization is removed from the validation step.

As indicated at a block 400, a Pre-Allocation of Ordinal Numbers phase of insert is performed prior to allocating the ordinal numbers that will be used for the insert. The primary function of this phase is to verify the program input parameters, and initialize the environment. As indicated at a block 402, an Allocation of Ordinal Numbers phase provides serialized allocation of ordinal numbers to ensure no two concurrent processes allocate the same ordinal numbers. The ordinal numbers are allocated in sequential order such that ordinal N is always allocated prior to ordinal N+1. As indicated at a block 404, a pre-Validation Processing phase of insert performs all of the mapping of data from the user's view of the data to the database file itself. The pre-Validation Processing phase of insert also performs maintenance on any logical views or indexes over the database file. Methods exist to perform this phase of insert concurrently. As indicated at a block 406, a validation phase of insert performs journalling operations to a write-ahead database journal, and marks the records as valid and readable records. As indicated at a block 408, a Post-Validation processing phase is used to control a concurrent force of database insertions, enabling the force processing method of the preferred embodiment.

Figure 5:
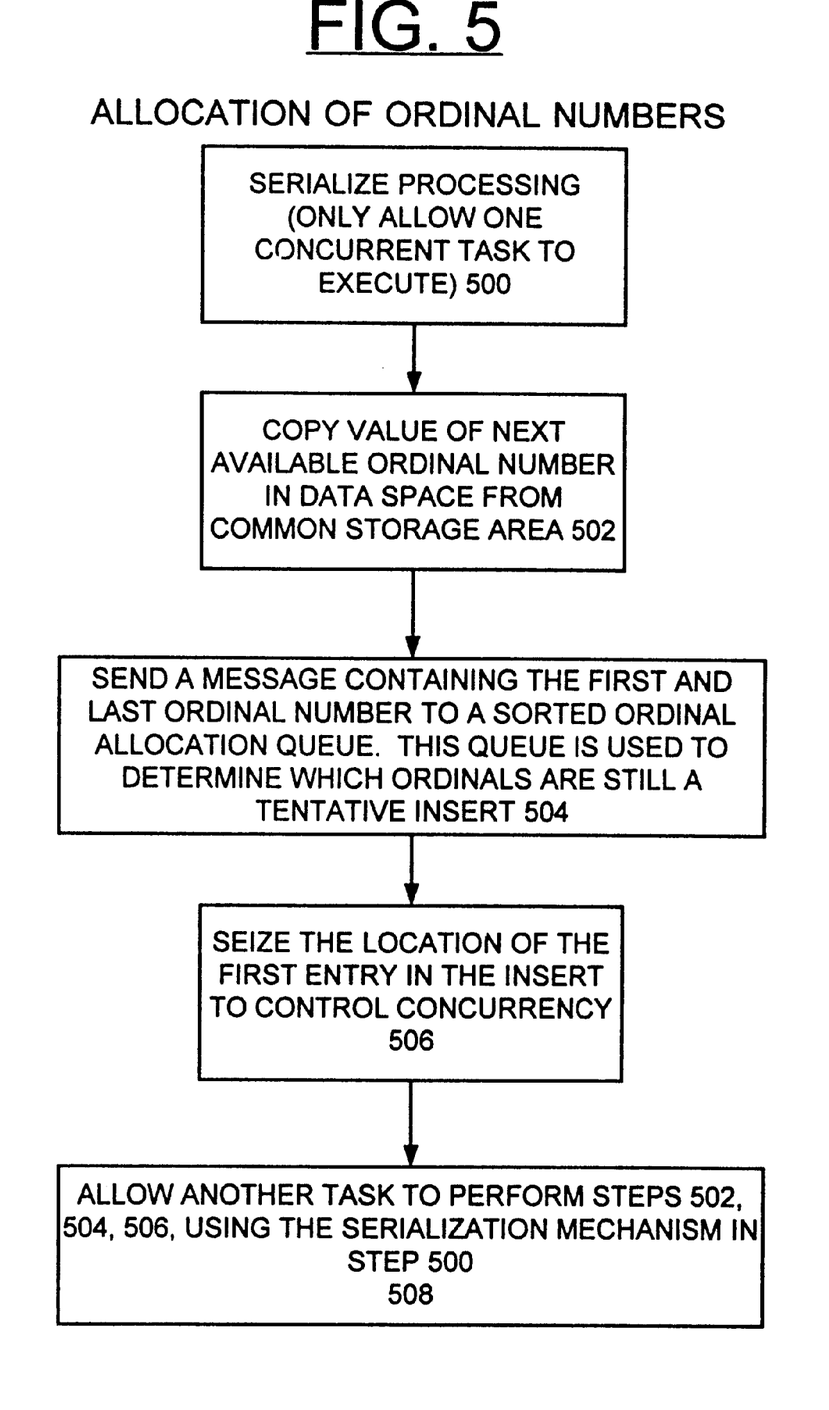

FIG. 5 illustrates the allocation of ordinal numbers of block 402 in FIG. 4. The allocation of ordinal numbers begins with an initially required, serialized processing, where only one concurrent task is allowed to execute as indicated at a block 500. Once the allocation step is performed, there is no need to remain serialized. The value of the next available ordinal number in the data space from the common storage area is copied as indicated at a block 502. A message containing the first and last ordinal number is sent to a sorted ordinal allocation queue as indicated at a block 504. This sorted ordinal allocation queue is used to determine which ordinals are still a tentative insert. The location of the first entry in the insert is seized to control concurrency as indicated at a block 506. Then another task is allowed to perform the steps at blocks 502, 504, and 506 using the serialization mechanism at block 500 as indicated at a block 508.

Figure 6:
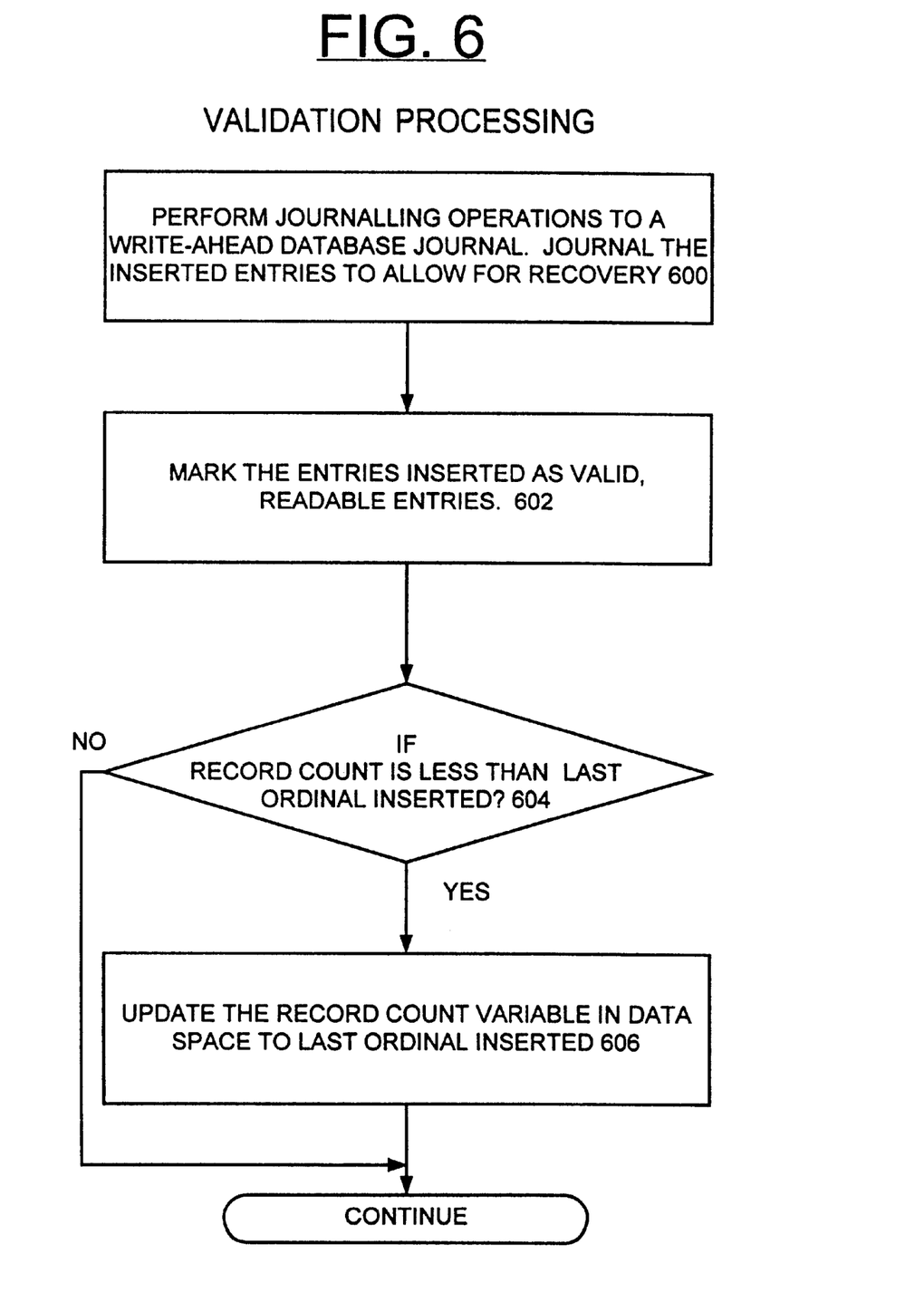

FIG. 6 illustrates the validation processing step 406 of FIG. 4 of the preferred embodiment. Removal of serialization of the validation processing step 406 of the preferred embodiment provides improved performance. The validation processing step begins with performing journalling operations to a write-ahead database journal as indicated at a block 600. The inserted entries are journaled to allow for recovery. Since there is an ordinal number order requirement on a write-ahead database journal for insert type entries, and the removal of the serialization can cause higher ordinal numbers to be journalled prior to lower ordinal numbers, a removal of this restriction must be implemented. The journal playback method must be altered to allow for inserting ordinal numbers past the end of the database file. For example, if the insert of ordinal N+1 appears in the journal prior to the insert of ordinal N, a method is needed to be implemented to handle this scenario to preserve the ordinal number integrity of the database file. When a journal entry of type insert is encountered past the end of the database file, the database file 300 is padded with deleted records up to the ordinal number represented in the database file. Then, the journal entry can be safely inserted into the database file while preserving the ordinal number of the journal entry. Since we may pad the database file with deleted records, it is possible that a journal entry's ordinal number corresponds to a deleted ordinal. When this occurs, the ordinal number must be undeleted with the image in the journal entry.

The inserted entries are marked as valid and readable entries or records as indicated at a block 602. If the RecordCount 306 is less than the last ordinal inserted as indicated at a decision block 604, then the RecordCount 306 is updated to the last ordinal inserted as indicated at a block 606. Otherwise, the RecordCount 306 is not updated.

Since the removal of the validated step serialization can cause records that are prior to the last valid ordinal to be tentative, and since retrieval methods can position to any ordinal prior to the last ordinal, a method of communicating the tentativeness of a given record must be implemented. The use of the TentInsForceCount along with a status bit for each record is used to determine if the record is a tentative insert. However, if the record is after the TentInsForceCount ordinal number, a check of the corresponding valid record bit is required to determine if the record is non-tentative. The valid record bit will only be set at block 602 when the record has completed its insert operation. Since the removal of the validated step serialization can cause tentative inserts prior to the last valid record, and since a tentative insert may fail to complete, it is necessary to account for these failed inserts to reduce the amount of unutilized space in the database file. When an insert fails to complete successfully and there are other inserts currently in progress, the ordinal numbers associated with the failed insert are marked as deleted. A conventional method for reusing deleted records is used to ensure that space is fully utilized.

Figure 7:
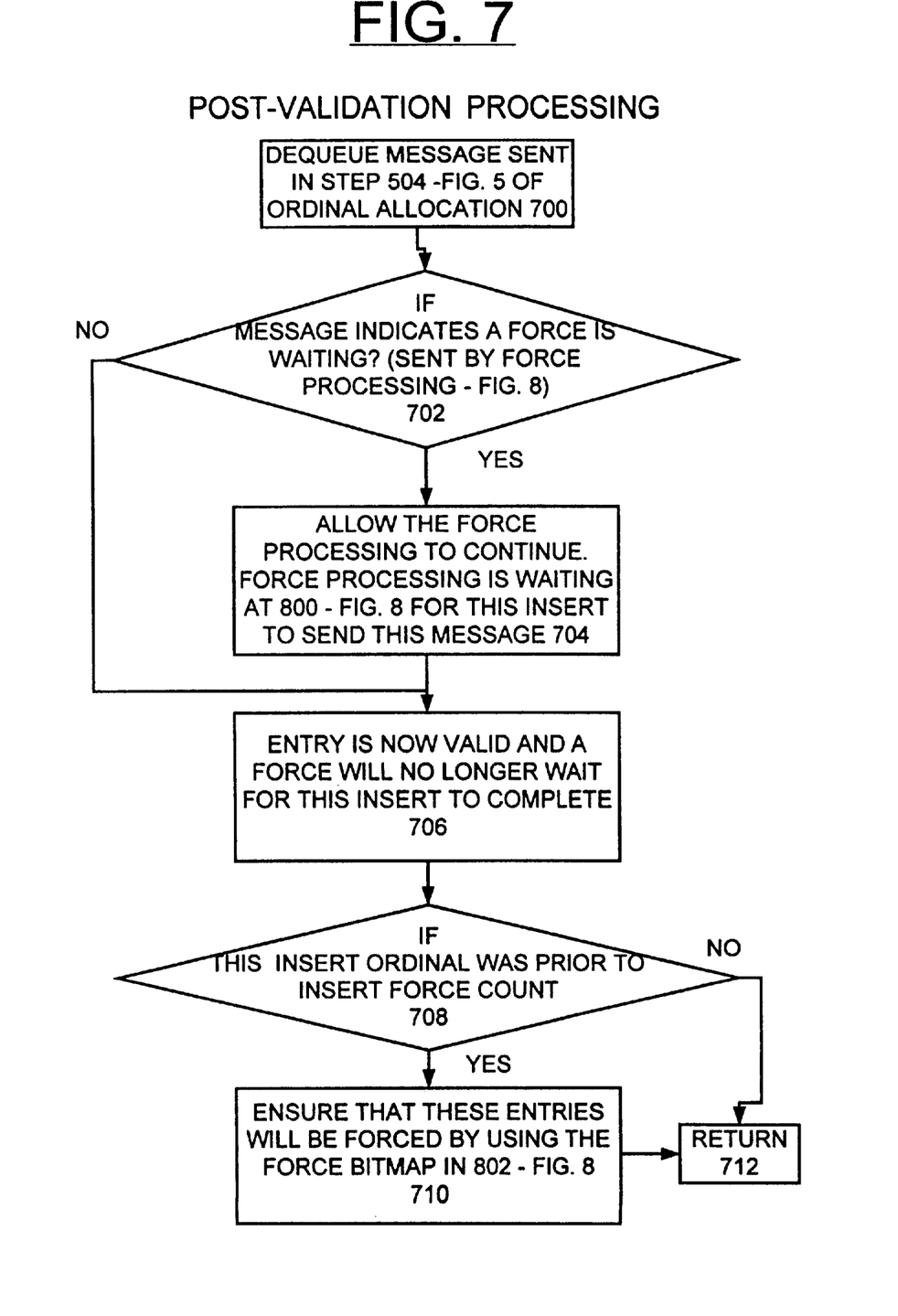
Figure 8:
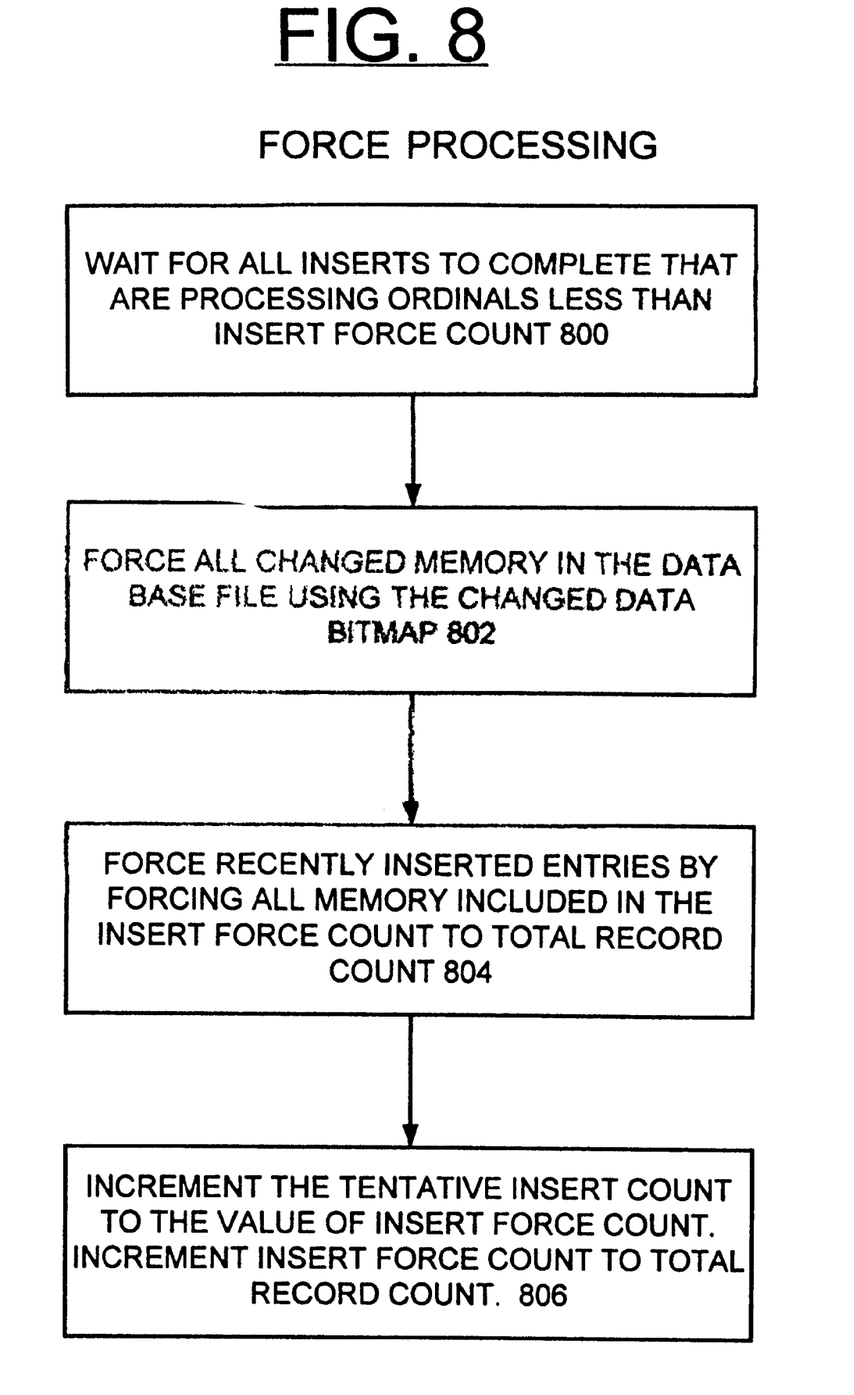

FIG. 7 illustrates the Post-Validation processing step 408 of the preferred embodiment. First, the message sent in step 504 in FIG. 5 of ordinal number allocation is dequeued as indicated at a block 700. If the message indicates a force is waiting, sent by force processing in FIG. 8, as indicated at a decision block 702, then the force processing is allowed to continue as indicated at a block 704. Force processing is waiting at block 800 in FIG. 8 for this insert to send this message at block 704. After the force processing is allowed to continue and if the message indicates a force is not waiting, the entry is now valid and a force will no longer wait for this insert to complete as indicated at a block 706. If this insert ordinal was prior to Insert Force Count 304 as indicated at a decision block 708, then a change data or force bitmap used at block 802 in FIG. 8 is used to ensure that these entries will be forced as indicated at a block 710. Otherwise when this insert ordinal was not prior to Insert Force Count 304, then the operations return.

FIG. 8 illustrates force processing steps of the preferred embodiment. First, the force processing will wait for all inserts of records within the range between TentInsForceCount 302 and ForceCount 304 to complete their insert processing as indicated at a block 800. This wait allows for the maintenance of the TentInsForceCount variable in step 4 at block 806 of the force processing. While this wait may cost some processing time during the force, it should be a relatively short amount of time. Since insert processing allocates ordinals in ordinal number order (lower ordinals are allocated prior to higher ordinals) in FIG. 5, insert processes that have allocated a lower ordinal number are more likely to have had more processing time to complete their insert. Therefore, the amount of wait time during this step at block 800 of the force should be minimal.

Second, the force processing will force the inserts of ordinals within the TentInsForceCount and ForceCount range that were tentative during the previous iteration of the force processing as indicated at a block 802. The changed data bitmap mechanism is used to determine which ordinals were tentative during the previous iteration of the force processing. When an insert of an ordinal within the range between TentInsForcecount 302 and ForceCount 304 completes, it will set a bit in the bitmap (at block 710 in FIG.

7) indicating that force processing must move the ordinal to non-volatile storage during this step at block 802 of its processing.

Third, the force processing will capture a snapshot of the RecordCount variable 306 and force all ordinals from Force-Count 304 to the captured RecordCount variable 306 as indicated at a block 804.

Finally in step 4 as indicated at a block 806, the force processing will update the TentInsForceCount 302 and ForceCount variable 304. TentInsForceCount 302 is updated to ForceCount 304 since all records prior to ForceCount 304 are now guaranteed to be non-tentative and forced because of the first step of the force processing at block 800. ForceCount 304 is updated to the captured value of Record-Count 306 since all non-tentative inserted records prior to RecordCount 306 have now been forced.

Figure 9:
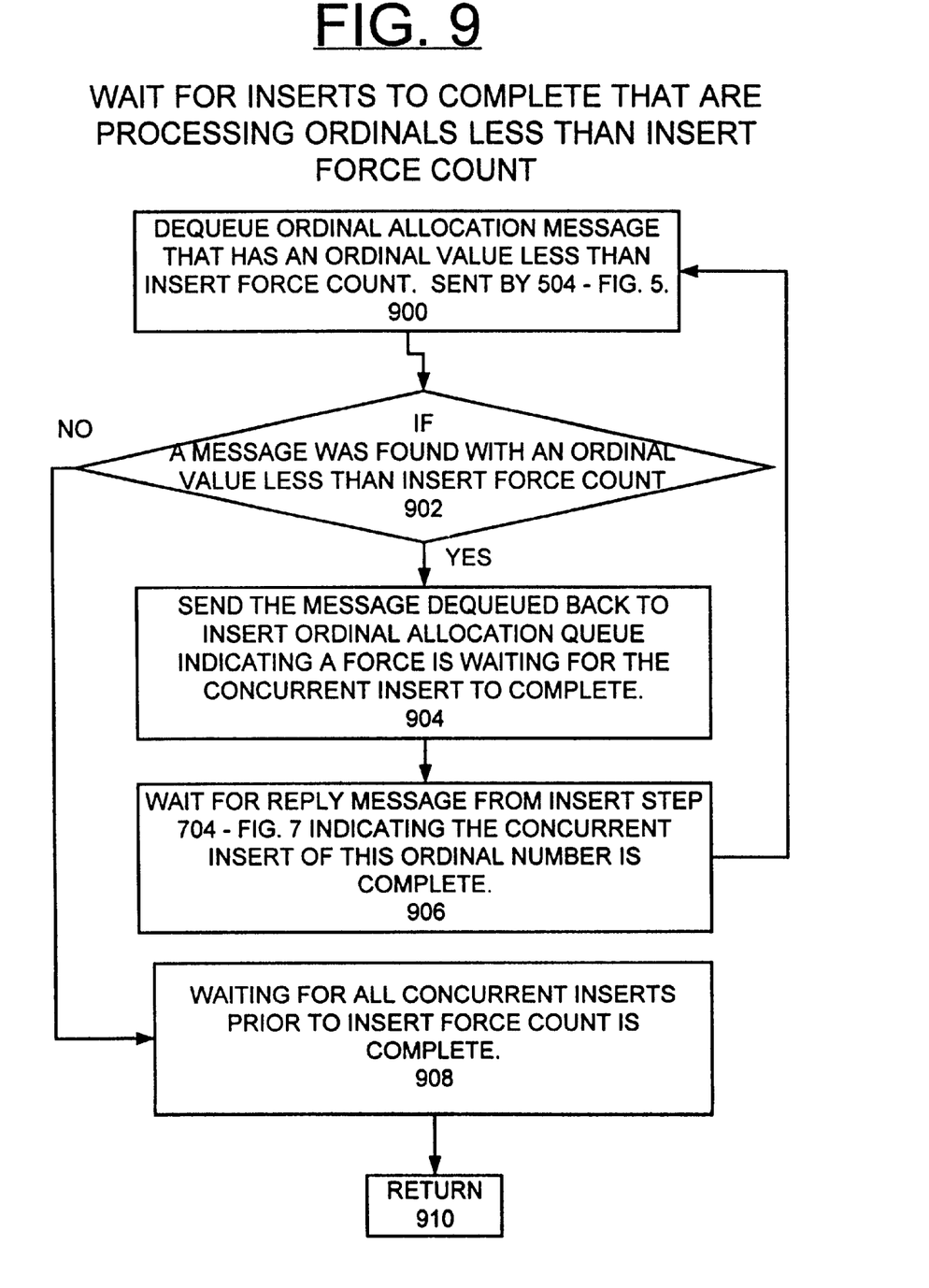

FIG. 9 illustrates the first force processing step to wait for all inserts of records within the range between TentInsForce-Count 302 and ForceCount 304 to complete their insert processing at block 800 of the preferred embodiment. The wait for inserts to complete force processing step 800 begins with dequeuing the ordinal allocation message that has an ordinal value less than the ForceCount 304, sent at block 504 in FIG. 5 as indicated at a block 900. If a message was found with an ordinal value less than the ForceCount 304 as indicated at a decision block 902, the message dequeued is sent back to the insert ordinal allocation queue indicating a force is waiting for the concurrent insert to complete as indicated at a block 904. Then waiting for a reply message from the insert step 704 in FIG. 7 indicating the concurrent insert of this ordinal number is complete is performed as indicated at a block 906. Then a next ordinal allocation message is dequeued returning to block 900. When a message was not found with an ordinal value less than the ForceCount 304 at decision block 902, then waiting for all concurrent inserts prior to insert force count has been completed as indicated at a block 908. Then the sequential operations return as indicated at a block 910.

The TentInsForceCount 302 and ForceCount 304 are used for special processing required to properly recover the database file 300 when the system terminates abnormally while inserting new ordinals to the database file. Since ordinals within the range between TentInsForceCount 302 and ForceCount 304 may have been tentative when the system terminated, IPL recovery must examine each ordinal within this range to determine if it is a valid record or not. Each invalid record that is encountered is marked as deleted. Next IPL recovery will examine records starting at ForceCount, and search for the first occurrence of an invalid record. When the first invalid record is found, RecordCount is reset to this ordinal position, and the remainder of the ordinals are cleared and become available to be allocated on insert processes during this IPL.

Since additional processing must be performed during IPL recovery, IPL recovery performance will be degraded. The degradation is minimized by the use of the TentIns-ForceCount 302. The use of the TentInsForcecount 302 allows IPL recovery to only examine records starting at the value of this variable. Due to the maintenance of this TentInsForceount variable 302, only a small portion of the database file 300 will be examined, therefore IPL recovery should not degrade by a significant amount.

Figure 10:
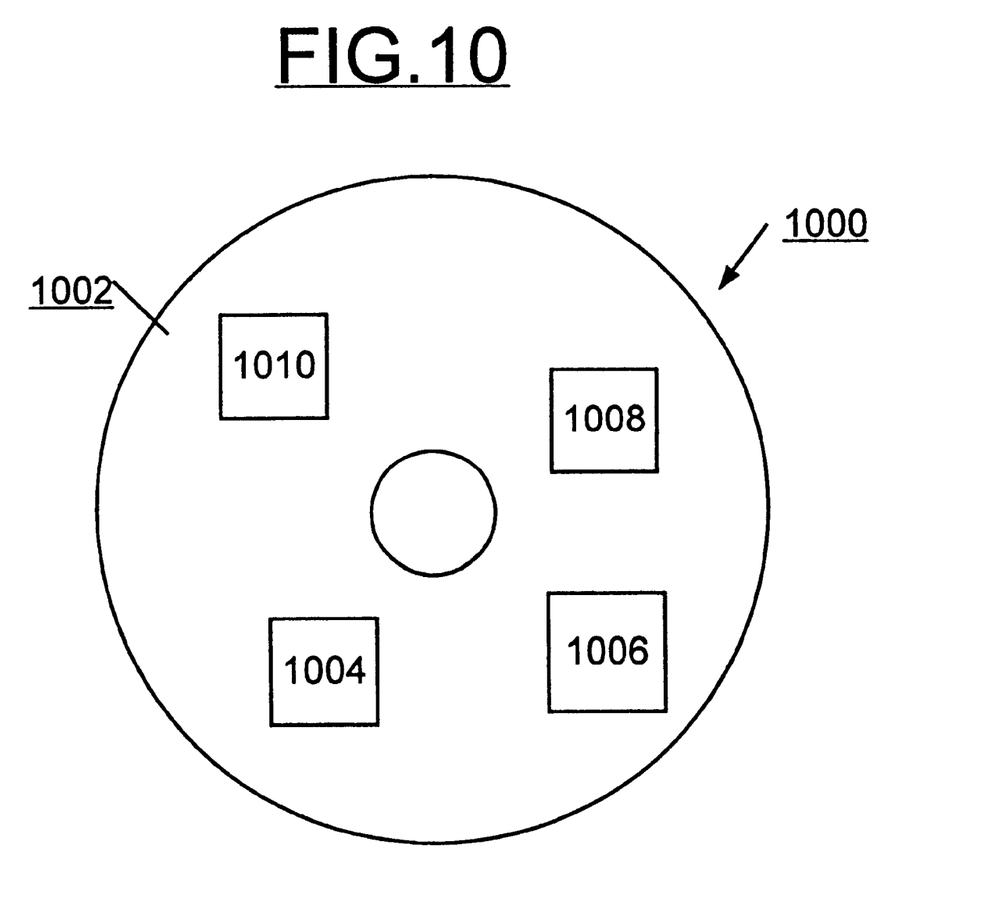
FIG. 10 is a block diagram illustrating a computer program product in accordance with the preferred embodiment.

Referring now to FIG. 10, an article of manufacture or a computer program product 1000 of the invention is illustrated. The computer program product 1000 includes a recording medium 1002, such as, a floppy disk, a high capacity read only memory in the form of an optically read compact disk or CD-ROM, a tape, a transmission type media such as a digital or analog communications link, or a similar computer program product. Recording medium 1002 stores program means 1004, 1006, 1008, 1010 on the medium 1002 for carrying out the methods for implementing highly concurrent record insertion in an 35 ordinal number dependent database of the preferred embodiment in the system 100 of FIG. 1.

A sequence of program instructions or a logical assembly of one or more interrelated modules defined by the recorded program means 1004, 1006, 1008, 1010, direct the computer system 100 for implementing highly concurrent record insertion in an ordinal number dependent database of the preferred embodiment.

While the present invention has been described with reference to the details of the embodiments of the invention shown in the drawing, these details are not intended to limit the scope of the invention as claimed in the appended claims.

What is claimed is:

1. A method for implementing highly concurrent record insertion in an ordinal number dependent database comprising the steps of:

providing serialized processing with one concurrent task of multiple concurrent tasks allowed to execute for allocation of ordinal numbers for record insertion; and enabling concurrent validation processing of multiple concurrent tasks for record insertion in the ordinal number dependent database; including the steps of:

maintaining a plurality of predefined counter variables, said predefined counter variable including a tentative insert force count variable with ordinal numbers less than or equal to said tentative insert force count variable being valid, inserted records; a total record count with ordinal numbers greater than said total record count being invalid; and an insert force count representing an ordinal number of a last record forced, said insert force count being greater than or equal to said tentative insert force count variable and being less than or equal to said total record count.

2. The method for implementing highly concurrent record insertion in an ordinal number dependent database as recited in claim 1 includes the step of maintaining said total record count by comparing said total record count with a last ordinal number inserted; and responsive to said total record count being less than said last ordinal number inserted, updating said total record count to said last ordinal number inserted.

3. The method for implementing highly concurrent record insertion in an ordinal number dependent database as recited in claim 1 includes the step of maintaining said tentative insert force count variable and said insert force count including the steps of force processing of record insertions including waiting for concurrent tasks to complete record insertions of ordinal numbers less than said insert force count; incrementing said tentative insert force count variable to said insert force count; and incrementing said insert force count to said total record count.

4. The method for implementing highly concurrent record insertion in an ordinal number dependent database as recited in claim 1 wherein the step of enabling concurrent validation processing of multiple concurrent tasks for record insertion in the ordinal number dependent database includes the step of performing concurrent journalling operations to a write-ahead database journal for multiple concurrent tasks.

5. The method for implementing highly concurrent record insertion in an ordinal number dependent database as recited in claim 4 includes the step of marking records inserted as valid, readable records for multiple concurrent tasks.

6. A computer program product for implementing highly concurrent record insertion in an ordinal number dependent database in a computer system, said computer program product including a plurality of computer executable instructions stored on a computer readable medium, wherein said instructions, when executed by said computer, cause the computer to perform the steps of:

provoding serialized processing with one concurrent task of multiple concurrent tasks allowed to execute for allocation of ordinal numbers for record insertion; and enabling concurrent validation processing of multiple concurrent tasks for record insertion in the ordinal number dependent database; including the steps of:

maintaining a plurality of predefined counter variables, said predefined counter variable including a tentative insert force count variable with ordinal numbers less than or equal to said tentative insert force count variable being valid, inserted records; a total record count with ordinal numbers greater than said total record count being invalid; and an insert force count representing an ordinal number of a last record forced, said insert force count being greater than or equal to said tentative insert force count variable and being less than or equal to said total record count.

7. A computer program product for implementing highly concurrent record insertion in an ordinal number dependent database as recited in claim 6 wherein said instructions, when executed by said computer, further cause the computer to update said tentative insert force count variable and said insert force count variable in the database structure during the force processing; where force processing is defined as the movement of database records from volatile to non-volatile memory.

8. A computer program product for implementing highly concurrent record insertion in an ordinal number dependent database as recited in claim 6 wherein said instructions, when executed by said computer, further cause the computer to update said total record count during said concurrent validation processing of multiple concurrent tasks for record insertion in the ordinal number dependent database.

9. A computer program product for implementing highly concurrent record insertion in an ordinal number dependent database as recited in claim 6 wherein the step of enabling concurrent validation processing of multiple concurrent tasks for record insertion in the ordinal number dependent database includes the steps of performing concurrent journalling operations to a writea-head database journal for multiple concurrent tasks.

10. A computer program product for implementing highly concurrent record insertion in an ordinal number dependent database as recited in claim 9 includes the step of marking records inserted as valid, readable records for multiple concurrent tasks.

* * * * *